No. 889,567. PATENTED JUNE 2, 1908.
J. L. WOODBRIDGE.
SYSTEM OF ELECTRICAL DISTRIBUTION.
APPLICATION FILED OCT. 2, 1907.
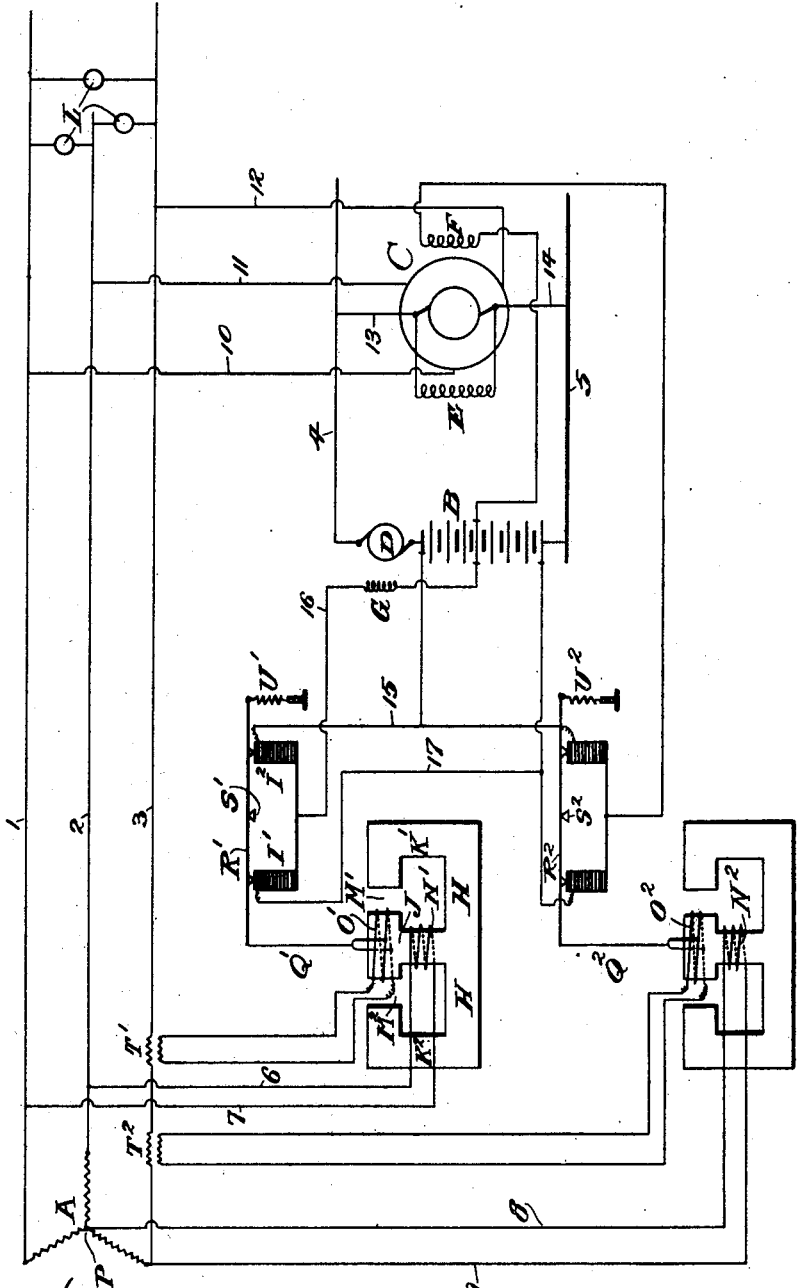
WITNESSES:
INVENTOR.
Joseph L. Woodbridge.
BY
Augustus B. Stoughton.
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

No. 889,567.  Specification of Letters Patent.  Patented June 2, 1908.

Application filed October 2, 1907. Serial No. 395,517.

*To all whom it may concern:*

Be it known that I, JOSEPH LESTER WOODBRIDGE, a citizen of the United States, and resident of Philadelphia, in the county of Philadelphia and State of Pennsylvania, have invented a certain new and useful System of Electrical Distribution, of which the following is a specification.

My invention relates to those systems of distribution in which alternating current and direct current circuits are interconnected by suitable transforming apparatus, and its object is to provide simple and efficient means for controlling the transfer of current between the circuits and transforming apparatus.

The nature and scope of my invention will be more fully understood by reference to the following description taken in connection with the accompanying drawing, in which A, is a source of three phase alternating current connected to the consumption circuit 1, 2, 3, which supplies the translating devices L.

C, is a rotary converter connected by the conductors 10, 11, 12, to the alternating current circuit 1, 2, 3, and connected at its direct current terminals by the conductors 13 and 14, to the direct current circuit 4, 5. Connected across the circuit 4, 5, is also shown a storage battery B, with its booster D. The rotary converter C, is provided with a main field coil E, connected across the direct current brushes in the usual manner. It is also provided with an auxiliary field coil F controlled by the controlling apparatus $Q^2$, whose operation will be described later. The booster D, is provided with a field coil G, controlled by the controlling apparatus $Q^1$ which latter will now be described.

$I^1$ and $I^2$, are two piles of carbon disks whose resistance may be varied by the variable pressure produced by the action of the lever $R^1$, whose fulcrum is at $S^1$. The operation of this lever $R^1$, is controlled by the adjustable spring $U^1$ at one end and the pull exerted by the solenoid $O^1$ at the other end. The terminals of the carbon piles are connected to three points in the battery B, by the conductors 15, 16, and 17, the field G, of the booster D, being connected in series with conductor 16. The operation of this part of the apparatus is set forth in Patent No. 763,168, to Justus B. Entz, and need not be further described herein, except as to the mode of operation of the solenoid $O^1$, which as here shown is made to respond to one component of the current in the alternating current circuit. H, is a magnetic circuit having a central core J, which carries the total magnetic flux. This flux divides between the two paths $K^1$ and $K^2$, passes across the air gaps $M^1$ and $M^2$ and again unites in the central core J. The magnetic flux in this magnetic circuit is produced by the potential coil $N^1$, whose terminals are connected across the conductors 1 and 2 of the alternating current circuit by means of conductors 6 and 7. The action of this coil is to produce a magnetic flux in the magnetic circuit and across the air gaps $M^1$ and $M^2$, this flux having a phase relation 90° behind the potential maintained across the conductors 1 and 2. The solenoid $O^1$ surrounds the upper portion of the core J, and is freely suspended from one end of the lever $R^1$, in such a manner that the magnetic flux crossing the air gaps $M^1$ and $M^2$, will cut the conductors of this solenoid. The terminals of this solenoid are connected to the secondary winding of a series transformer $T^1$, whose primary is connected in series with conductor 3, of the alternating current circuit. At unity power factor the current in the solenoid $O^1$ will have a phase relation displaced 90° from the potential across the conductors 1, 2, and will therefore be in phase with the magnetic flux across the air gaps $M^1$ and $M^2$. Under these conditions a pull will be exerted by the solenoid $O^1$ upon the lever $R^1$ proportional to the product of the magnetic flux in the air gaps $M^1$ and $M^2$ by the current in the solenoid $O^1$. If the power factor on the circuit 1, 2, 3, is not unity the pull of the solenoid $O^1$, will be proportional to the product of the magnetic flux in the air gaps multiplied by that component of the current which is in phase with the magnetic flux, that is with the energy component of the current. The wattless component will have no effect on the lever $R^1$. The effect of the controlling apparatus $Q^1$, will therefore be to produce variations of pressure on the carbon piles $I^1$ and $I^2$, in response to small changes of energy in the alternating current circuit, and these variations of pressure will cause corresponding currents to flow through the field G of the booster D, thus causing the battery to charge from or discharge into the alternating current circuit through the converter C, to compensate for fluctuations in the energy consumption of the translating devices L.

The controlling apparatus $Q^2$, is identical with that shown at $Q^1$ in every respect, except that the potential coil $N^2$ is connected between the central point P of the source A, and the conductor 3, while the solenoid $O^2$ is connected to the secondary winding of a current transformer $T^2$, whose primary is in series with conductor 3. At unity power factor the potential maintained across the coil $N^2$ will be in phase with the current in the solenoid $O^2$ and the magnetic flux produced by the coil $N^2$ will be displaced 90° from the current in $O^2$, and will therefore produce no effect on the latter coil. If, however, the power factor is not unity, there will be a component of current in the coil $O^2$ displaced 90° from the potential across $N^2$, and therefore in phase with the magnetic flux. Under these conditions the coil $O^2$ will produce a pull on the lever $R^2$ of the carbon regulator proportional to the product of the magnetic flux multiplied by the wattless component of the current. The regulating apparatus $Q^2$ controls the current in the auxiliary field S of the converter C, in the same manner that the controlling apparatus $Q^1$ controls the current in the coil G of the booster D, but the controlling apparatus $Q^2$, as described above, responds to the wattless component of current on the alternating current circuit. Small variations of this wattless component will produce variations of current in the field F. This field is so connected that a lagging component of current in the conductor 3, will, through the operation of the controlling apparatus $Q^2$, produce a current in the field F, in the direction to increase the excitation of the converter C. The well known result of this increase will be to cause the converter C, to supply the lagging currents to the circuit 1, 2, 3, thus relieving the source A, of the greater part of the fluctuations in the wattless component of the current. The apparatus shown in the drawings, therefore, provides means for compensating for the fluctuations of both the energy and the wattless components of current on the alternating current circuit, and the compensation of each component may be independently controlled by means of the adjustable springs $U^1$ and $U^2$.

What I claim is:

1. In combination an alternating current circuit, a direct current source, transforming apparatus connected between the alternating current circuit and the direct current source, and means for controlling the transfer of current between the transforming apparatus and the alternating current circuit, said means responsive to only such component of the current in the alternating current circuit as bears a predetermined phase relation to the voltage of said circuit.

2. In combination an alternating current circuit compensating means connected to said circuit and adapted to deliver to and receive from said circuit alternating current, and regulating means adapted to control both the amount and phase relation of the current transferred between said circuit and the compensating means, said regulating means responsive both to the amount and phase relation of the current in the alternating current circuit.

3. An alternating current circuit, compensating means connected to said circuit and adapted to deliver to and receive from said circuit alternating current, one regulator adapted to control the transfer of energy between the compensating means and the circuit and responsive to the energy component of current in the circuit, and a second regulator adapted to control the transfer of wattless current between the compensating means and the circuit and responsive to the wattless component current in the circuit.

4. An alternating current circuit, a source of alternating current connected to the circuit and provided with a field winding, a magnetic circuit, means for inducing in the magnetic circuit a magnetic flux proportional to the voltage of the alternating current circuit, a conducting coil independently supported in the path of the magnetic flux, means for transmitting through the coil current corresponding in amount and phase relation to the current in the alternating current circuit, and means responsive to the force exerted on the coil by the flux and adapted to control the flow of current in the field winding of the source.

In testimony whereof I have hereunto signed my name.

JOSEPH LESTER WOODBRIDGE.

Witnesses:
W. J. JACKSON,
FRANK E. FRENCH.